(12) United States Patent
Sarin et al.

(10) Patent No.: US 9,928,373 B2
(45) Date of Patent: Mar. 27, 2018

(54) TECHNIQUE FOR DATA LOSS PREVENTION FOR A CLOUD SYNC APPLICATION

(71) Applicant: Symantec Corporation, Mountain View, CA (US)

(72) Inventors: Sumit Manmohan Sarin, Pune (IN); Kedar V. Apte, Pune (IN)

(73) Assignee: SYMANTEC CORPORATION, Mountain View, CA (US)

( * ) Notice: Subject to any disclaimer, the term of this patent is extended or adjusted under 35 U.S.C. 154(b) by 57 days.

(21) Appl. No.: 14/688,158

(22) Filed: Apr. 16, 2015

(65) Prior Publication Data
US 2016/0292437 A1    Oct. 6, 2016

(30) Foreign Application Priority Data
Mar. 31, 2015  (IN) ............................ 1710/CHE/2015

(51) Int. Cl.
*H04L 29/06* (2006.01)
*G06F 21/62* (2013.01)
*H04L 9/32* (2006.01)

(52) U.S. Cl.
CPC ........ *G06F 21/6209* (2013.01); *H04L 9/3242* (2013.01)

(58) Field of Classification Search
CPC .. G06F 21/6209; G06F 21/62; G06F 21/6245; G06F 21/64; H04L 9/3236; H04L 9/3242
USPC ................................................ 726/26
See application file for complete search history.

(56) References Cited

U.S. PATENT DOCUMENTS

| | | | | |
|---|---|---|---|---|
| 8,060,596 | B1* | 11/2011 | Wootton | G06F 21/6218 709/223 |
| 8,224,796 | B1* | 7/2012 | Shinde | G06F 17/30117 707/695 |
| 8,438,630 | B1* | 5/2013 | Clifford | G06F 21/60 375/240.02 |
| 8,495,705 | B1* | 7/2013 | Verma | G06Q 10/06 711/163 |
| 2004/0221172 | A1* | 11/2004 | Stamos | G06F 21/606 726/27 |
| 2010/0218002 | A1* | 8/2010 | Graziani | G06F 21/64 713/194 |
| 2014/0026181 | A1* | 1/2014 | Kiang | G06F 21/60 726/1 |

* cited by examiner

*Primary Examiner* — Yogesh Paliwal
(74) *Attorney, Agent, or Firm* — Patterson + Sheridan, LLP

(57) ABSTRACT

Techniques describe preventing sensitive data from being misappropriated during an operation performed by a cloud synchronization application. A request from a cloud sync application to upload a file to a cloud storage service is intercepted. The file is currently stored on a client computer of an enterprise network. An account associated with the request is identified. The file is evaluated based on a data loss prevention policy and the account associated with the request. The request is blocked based on the evaluation.

14 Claims, 6 Drawing Sheets

TECHNIQUE FOR DATA LOSS PREVENTION FOR A CLOUD SYNC APPLICATION

CROSS-REFERENCE TO RELATED APPLICATION

This application claims benefit of Indian Provisional Patent Application Serial No. 1710/CHE/2015 filed Mar. 31, 2015, which is incorporated herein by reference in its entirety.

BACKGROUND

Field

Embodiments presented herein generally relate to data loss prevention (DLP) in a computer system, and more specifically, to techniques for providing DLP in cloud synchronization applications.

Description of the Related Art

Data loss prevention (DLP) refers to a variety of techniques for protecting sensitive data. In endpoint DLP, a DLP agent can monitor and control activity occurring within a client computing system according to a policy, usually specified by an administrator (e.g., of an enterprise network). The DLP agent can block attempted transmissions of sensitive data and generate incident reports describing such attempts.

One issue that DLP addresses is preventing sensitive data from being leaked by a client computing system to a cloud storage service. Many enterprise networks rely on a cloud storage services (e.g., Box, Dropbox, Google Drive, etc.) to store data. Cloud storage services also facilitate online collaboration on documents. For example, an enterprise network may maintain a list of customer information on a cloud storage service. Users may collaborate to edit the list in real-time. Each user may download the list on a client computer, e.g., through a storage interface on the web, a cloud synchronization ("sync") application, or a cloud storage-integrated productivity application. When a given user modifies the listing, the modifications can be saved to cloud storage via an enterprise account associated with the user on the service, e.g., through a cloud sync application on the client computer, a web interface on a browser, or a productivity application that is integrated with the cloud storage service.

However, using cloud services also risks leaking sensitive data to a user's personal account. Continuing the previous example, it is undesirable if a user saves the listing of customer information to a personal account (instead of the enterprise account) on the cloud storage service.

SUMMARY

Embodiments presented herein describe a method. The method generally includes intercepting a request, from a cloud sync application, to upload a file to a cloud storage service. The file is currently stored on a client computer of an enterprise network. An account associated with the request is identified. The method also includes evaluating the file based on a data loss prevention (DLP) policy and the account associated with the request. The request is blocked based on the evaluation.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
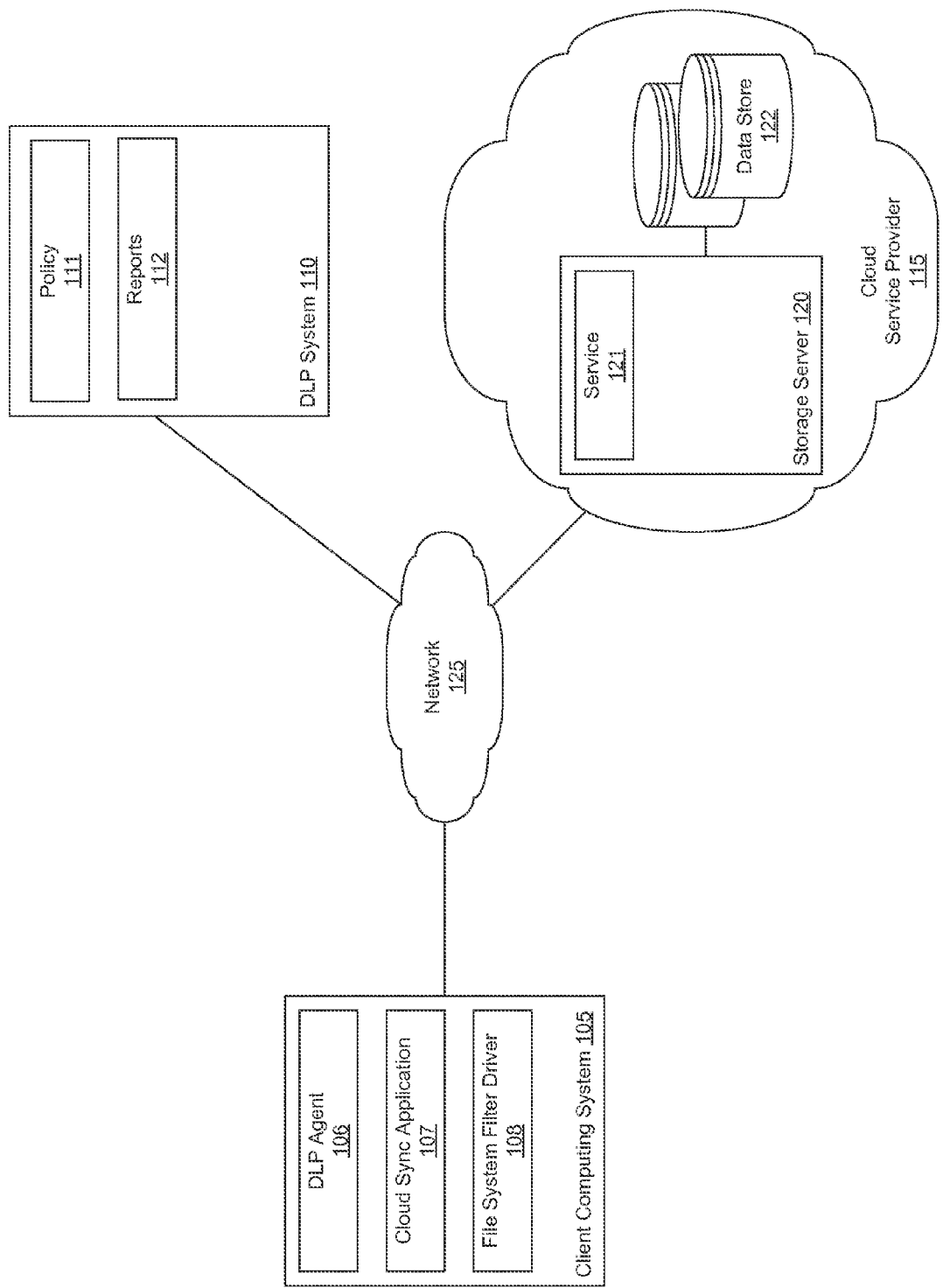
FIG. 1 illustrates an example computing environment, according to one embodiment.

A cloud synchronization ("sync") application synchronizes data hosted by a cloud storage service (e.g., Dropbox, Google Drive, Microsoft OneDrive, etc.) with a copy of the data stored locally on a client computer. One concern with cloud sync applications is the potential for leakage of sensitive data in an enterprise setting. Files stored on a cloud storage service and downloaded to a client computer for legitimate purposes, such as for editing often contain sensitive data. However, one concern is allowing a user to upload such files to an unauthorized account on the cloud storage service, using the cloud sync application.

Embodiments presented herein describe techniques for preventing sensitive data from being misappropriated during sync operations performed by a cloud sync application. In one embodiment, a file system filter driver intercepts a request from the cloud sync application to upload a file to a cloud storage service. The filter driver may evaluate file attributes (e.g., file path, file type, and the like). The filter driver determines, based on the evaluation, whether the file is a specified type to be monitored based on a DLP policy. If so, a DLP agent determines whether the cloud sync application is currently signed into an enterprise account. If not (e.g., the application is currently signed into a non-enterprise or personal account), the filter driver analyzes the content of the file against the DLP policy, e.g., to determine whether the file contains sensitive data. The filter driver may quarantine files that contain sensitive data (or are otherwise subject to quarantine under the policy). If an enterprise account is signed into the cloud storage service, the filter driver may analyze the data under a policy. In such a case, if the filter driver determines that the data is sensitive, then the filter driver may encrypt the file prior to allowing the file to be stored on the cloud storage service.

Further, to prevent repeated analysis of unmodified files (e.g., evaluated files that are downloaded to systems of other users), the filter driver may generate a cryptographic hash of attributes associated with the file. One example of an applicable cryptographic hash is a hash-based message authentication code (HMAC). A generated HMAC can be a hash of file attributes such as file path, file size, date modified, and the like. The filter driver determines, on subsequent access to the file, whether the file has changed. That is, on subsequent accesses, the filter driver generates another HMAC for the file and compares that HMAC and the previously generated HMAC. If the HMAC values match, then the filter driver determines that the file does not need to be analyzed against the DLP policy. However, if the HMAC values differ, then the filter driver determines that the file should be analyzed due to changes made to the file.

Advantageously, the techniques described herein provide a file system-based approach to prevent sensitive data from being leaked from a cloud sync application. The filter driver intercepts file system calls made by the cloud sync application, e.g., to open or read a file. Further, by identifying an user associated with an account signed-in to the cloud sync application, the DLP agent can determine whether the cloud sync application is attempting to upload a given file to storage associated with an enterprise or a personal cloud service account. In addition, by generating a HMAC of attributes for each DLP-analyzed file, the DLP agent analyzes that file again only if the file has been modified (i.e., if the HMAC changes). Doing so prevents large amounts of I/O operations related to DLP analysis from occurring.

FIG. 1 illustrates an example computing environment 100, according to one embodiment. As shown, computing environment includes a client computing system 105, a DLP system 110, a cloud service provider 115, and a network 125. In one embodiment, the client computing system 105 is a physical computing system, e.g., a desktop computer, a laptop computer, etc. Further, the client computing system 105 may be one of many client computers residing within an enterprise network.

In one embodiment, the client computing system 105 includes a data loss prevention (DLP) agent 106, a cloud sync application 107, and a file system filter driver 108. The DLP agent 106 monitors and controls activity occurring within the client computer 105. The DLP agent 106 blocks attempted transmissions of sensitive data (e.g., personal information, confidential information, and the like) to locations unauthorized by specified policies 111 (e.g., maintained on the DLP system 110).

The cloud service provider 115 includes a storage server 120 and a data store 122. The storage server 120 provides a service 121 that allows the clients to maintain data in the data store 122. For example, the cloud sync application 107 allows the client computing system 105 to upload and continuously sync data to the data store 122. Further, the cloud service provider 115 may segment user accounts based on a configuration. The configuration may describe an identity associated with a particular account, e.g., whether the account is associated with a given enterprise network, or whether the account is a personal account and not associated with any particular enterprise or organization.

The cloud sync application 107 syncs data between the client computer 107 and the service 122. Typically, the cloud sync application 107 monitors activity on a specified sync directory on a file system of the client computer 107. For example, if a user adds a file to the sync directory, the cloud sync application 107 detects the addition and uploads the file to the service 122. As another example, if a user modifies the file, the cloud sync application 107 may detect the modification and upload a delta indicating changes to the file. As yet another example, assume multiple users collaborate on that file. If another user modifies that file, the file is updated on the service 122. In addition, the file is also updated locally in the file system of the client computer 105.

The cloud sync application 107 may potentially leak sensitive data. For example, a user that is connected to the cloud sync application 107 through an enterprise account may have access to files containing confidential information, such as customer data, credit card numbers, and the like. The user can log out from and log in back into the service 122 using a personal account. The user may then designate the sync directory for the personal account as the directory that contains those files. As a result, the cloud sync application 107 would sync those files to the personal account.

Typically, the cloud sync application 107 performs a series of file system operations when syncing a file between the client computer 105 and the service 121. For example, when a user updates a file in the sync directory, the cloud sync application may prepare to upload the update to the server 122. In such a case, the cloud sync application 107 performs a variety of file system operations to upload the file.

In one embodiment, the file system filter driver 108 monitors file system calls made by the cloud sync application 107. Doing so allows the filter driver 108 to detect attempts by the cloud sync application 107 to sync a file with the service 121. As further described below, when detected, the file system filter driver 108 intercepts file system calls and determines whether to the DLP agent 106 should perform DLP analysis on the file to be synced. The DLP agent 106 may analyze the file relative to the policy 111 to determine whether the file contains sensitive data. If so, the DLP agent 106 may prevent the file from being synced with the service 121. The DLP agent 106 may also generate an incident report 112 describing the attempt and send the report 112 to the DLP system 110.

Figure 2:
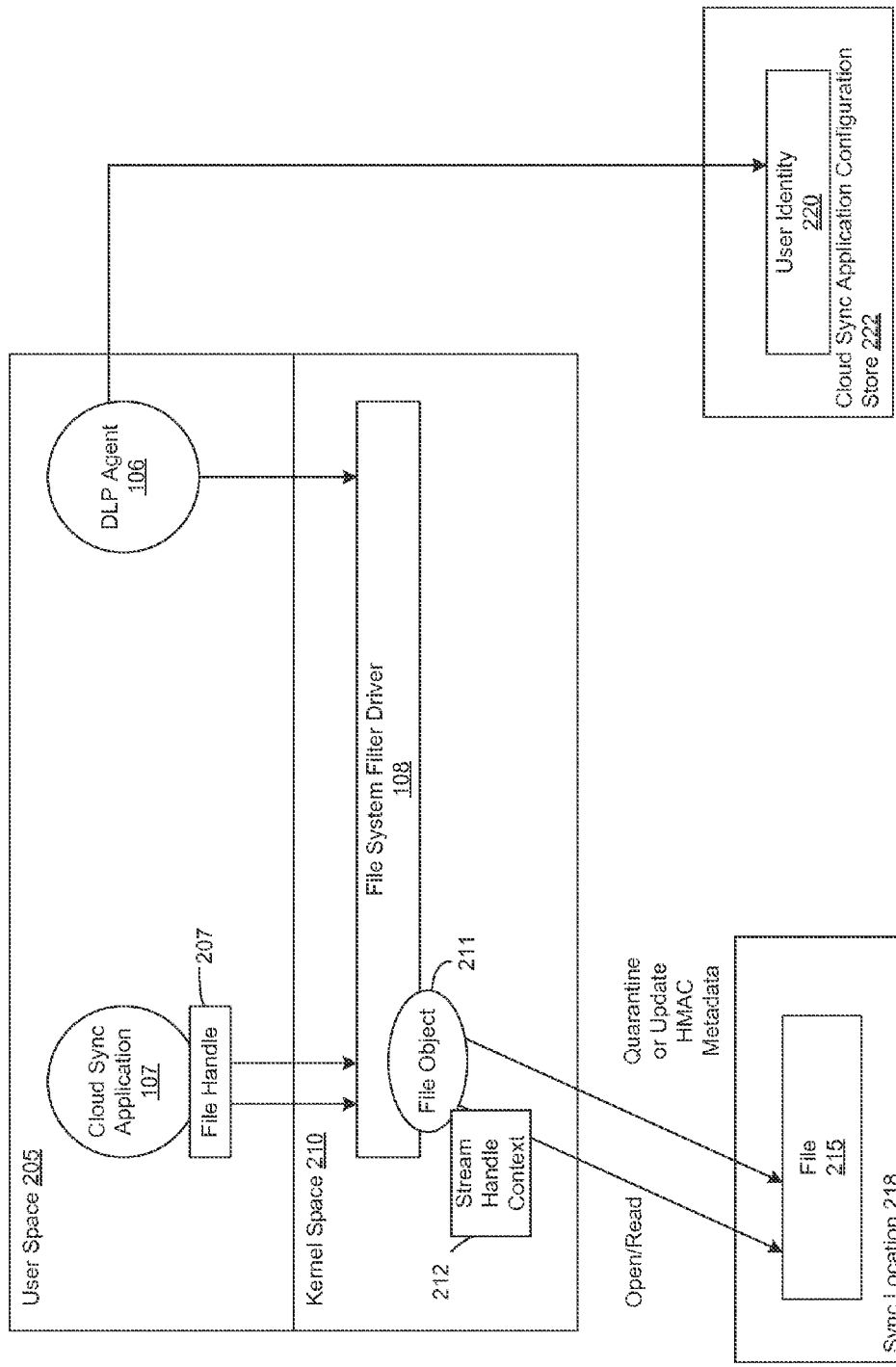
FIG. 2 illustrates a diagram describing preventing loss of sensitive data in a sync operation, according to one embodiment.

FIG. 2 illustrates a diagram describing preventing loss of sensitive data in a sync operation, according to one embodiment. Illustratively, FIG. 2 depicts a user space 205 and a kernel space 210 of an operating system executing in the client computer 105. The user space 205 includes the cloud sync application 107 and the DLP agent 106. The kernel space 210 includes the file system filter driver 108.

In one embodiment, the DLP agent 106 identifies a user identity 220, which is maintained in a cloud sync application configuration store 222. The user identity 220 allows the DLP agent 106 to identify information about an account that is currently logged into the service 121 via the cloud sync application 107, i.e., whether the account is associated with the enterprise network. If the account is not associated with the enterprise network, then the DLP agent 106 enables the file system filter driver 108. In one embodiment, the DLP agent 106 may enable the file system filter driver 108 for an enterprise account. In such a case, the file system filter driver 108 may apply a different set of policies to the account, e.g., the file system filter driver 108 may encrypt a given file prior to allowing the cloud sync application 107 to upload the file to the service 121.

In one embodiment, the cloud sync application 107 performs an open operation for a given file 215 stored in the file system when syncing the file 215 with the service 121. The operation result includes a file handle 207, which the application 107 uses to access the file. Illustratively, the file system filter driver 108 intercepts the open operation. The file system filter driver 108 retrieves a file object 211 associated with the file 215. The file system filter driver 108 determines, based on the file object 211, attributes of the file 215, such as file type, file path, file size, and last modified date/time of the file. The file system filter driver 108 may then determine, based on the attributes, whether the file should be monitored based on the DLP policy 112. For example, the DLP policy 112 may specify that PDF files, spreadsheets, and documents should be monitored for potential DLP analysis. As another example, the DLP policy 112 may specify that image files that are modified after a given year should be monitored.

If the file system filter driver 108 determines to monitor the file 215, the file system filter driver 108 allows the cloud sync application 107 to open the file 215. In addition, the file system filter driver 108 generates a stream handle context 212 to associate with the file object 211. The stream handle context 212 is a data structure that includes process and user information for the file (e.g., user ID, process ID, and the like).

In one embodiment, the file system filter driver 108 generates a cryptographic hash, such as a hash-based message authentication code (HMAC), for the file 215. The file system filter driver 108 uses the HMAC to determine whether the file 215 has already been analyzed under the DLP policy 112. That is, prior to analyzing the content of the file 215, the file system filter driver 108 generates an updated HMAC for the file 215. The file system filter driver 108 then compares the updated HMAC with the previous HMAC (if available). Matching HMACs indicate that the file 215 is unchanged since the last DLP analysis. Therefore, if the HMACs match, the file system filter driver 108 determines that further DLP analysis is unnecessary. Non-matching HMACs indicate that the file 215 was modified since the last DLP analysis. In this case, the file system filter driver 108 determines that DLP analysis should be performed on the file 215. In such a case, the DLP agent 106 evaluates the file 215 based on the DLP policy. If the DLP agent 106 determines that the file 215 contains sensitive data and the sync should be blocked, the DLP agent 106 may relocate the file 215 to a quarantine location and prevent further access to the file 215 by the cloud sync application. Further, the DLP agent 106 may generate an incident report describing the attempted sync operation.

Figure 3:
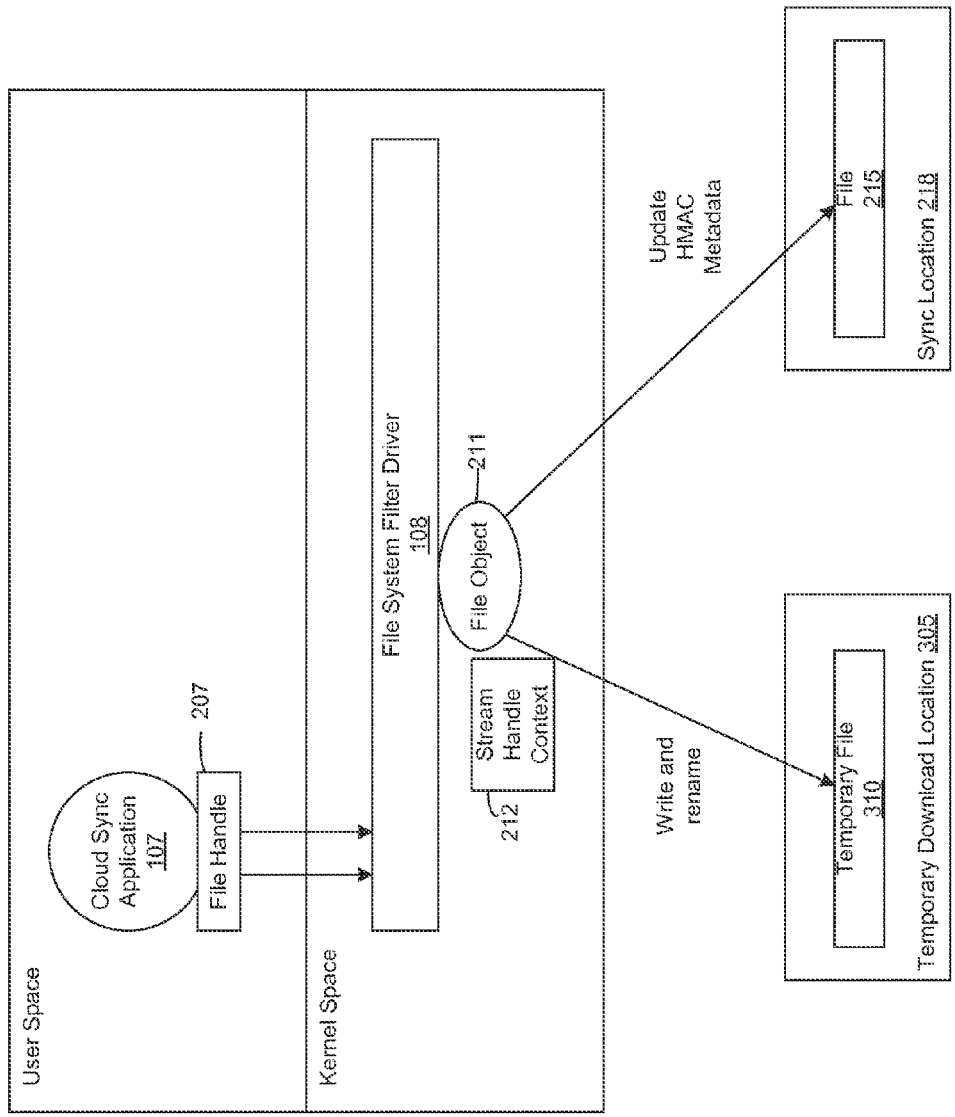
FIG. 3 illustrates a diagram describing preventing loss of sensitive data in a sync operation, according to one embodiment.

FIG. 3 illustrates a diagram describing preventing loss of sensitive data in a sync operation, according to one embodiment. In some cases, a user may collaborate on editing a file 215 maintained by the service 121 with other users of the enterprise network. In such a case, another user may edit the file 215. In turn, the cloud sync application 107 updates the file locally. Once updated, the file system filter driver on the other user's system may perform an unwanted DLP analysis on the file 215.

The cloud sync application 107 updates the file locally on the client computer 105 of the user. Typically, to do so, the cloud sync application 107 saves the updated file to a temporary download location 305 on disk (as temporary file 310). The cloud sync application 107 subsequently performs a rename operation on the file and saves the file to the sync location 218.

To prevent a repeated DLP analysis on the local file, the file system filter driver 108 intercepts rename operations performed by the cloud sync operation. When intercepted, the file system filter driver 108 generates an HMAC for the updated file and updates the HMAC currently associated with the file. Thus, when the file system filter driver 108 subsequently detects an open operation by the cloud sync application 107 to the file 215, the file system filter driver 108 can bypass the DLP analysis because the updated HMAC will match with a subsequently generated HMAC.

Figure 4:
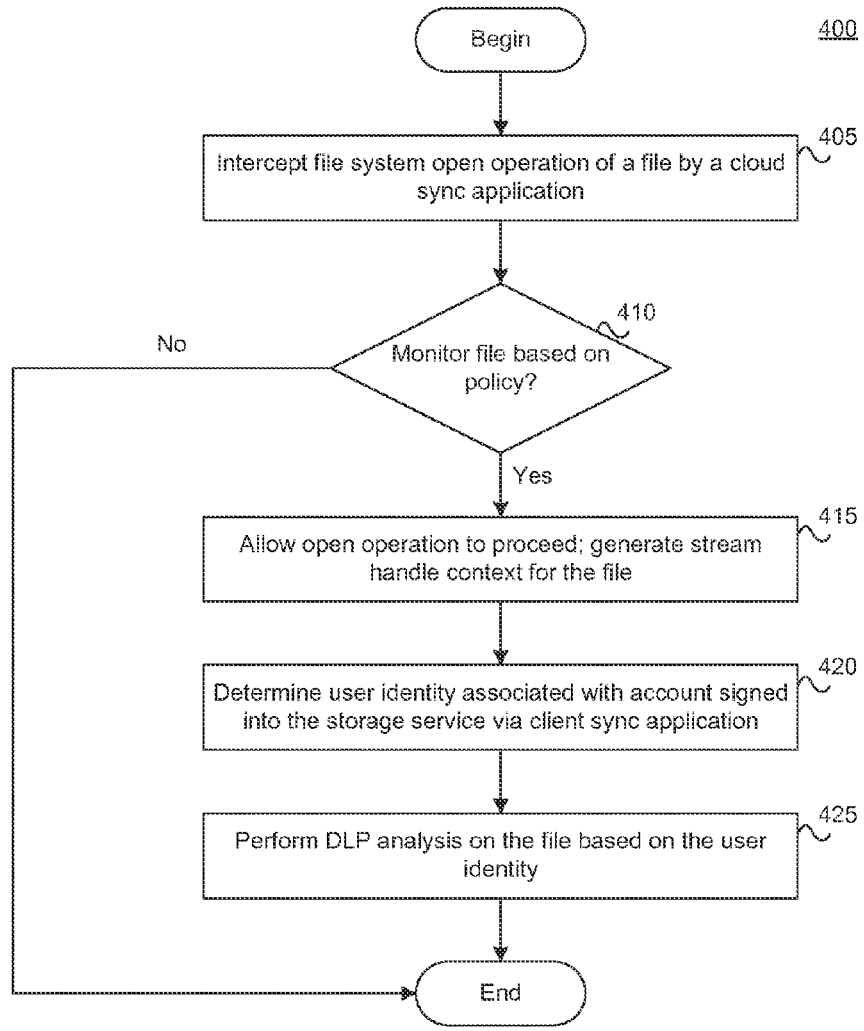
FIG. 4 illustrates a method for managing a request to access a file by a cloud sync application, according to one embodiment.

FIG. 4 illustrates a method for managing a request to access a file by the cloud sync application 107, according to one embodiment. As stated, the file system filter driver 108 monitors activity of the cloud sync application 107 and intercepts file system calls performed by the application 107. For example, assume that a client associated with an enterprise network adds a file to a sync directory. The cloud sync application 107 may begin syncing the file with the service 121 by performing an open operation of the file.

At step 405, the file system filter driver 108 intercepts the file system open operation of the file. The file system filter driver 108 obtains a handle and file object associated with the file. The file object describes various file attributes, such as file path, file size, file type, and the like. At step 410, the file system filter driver 108 determines, based on the file attributes, whether to monitor the file based on a DLP policy. For example, the policy may specify that files of a given type (e.g., PDF, spreadsheet, binary image) or having a given last modified date (e.g., modified after a given date) should be monitored. If not, the driver 108 allows the sync to proceed normally.

Otherwise, at step 415, the file system filter driver 108 allows the open operation to proceed. Further, the file system filter driver 108 generates a stream handle context for the file. As stated, the stream handle context provides process and user information associated with the file. At step 420, the DLP agent 106 determines a user identity associated with the account signed into the service 121 via the client sync application. The user identity indicates whether the account that is currently signed into the service 121 through the application 107 is associated with the enterprise. The DLP agent 106 sends the determination to the filter driver 108. Then at step 425, the filter driver 108 performs DLP analysis on the file based on the identity. That is, in some cases, the driver 108 may apply a different set of policies to the file. For example, the driver 108 may encrypt the file prior to allowing the sync operation to proceed. Otherwise, if the account is not associated with the enterprise, the driver 108 determines that DLP analysis should be performed on the file.

Figure 5:
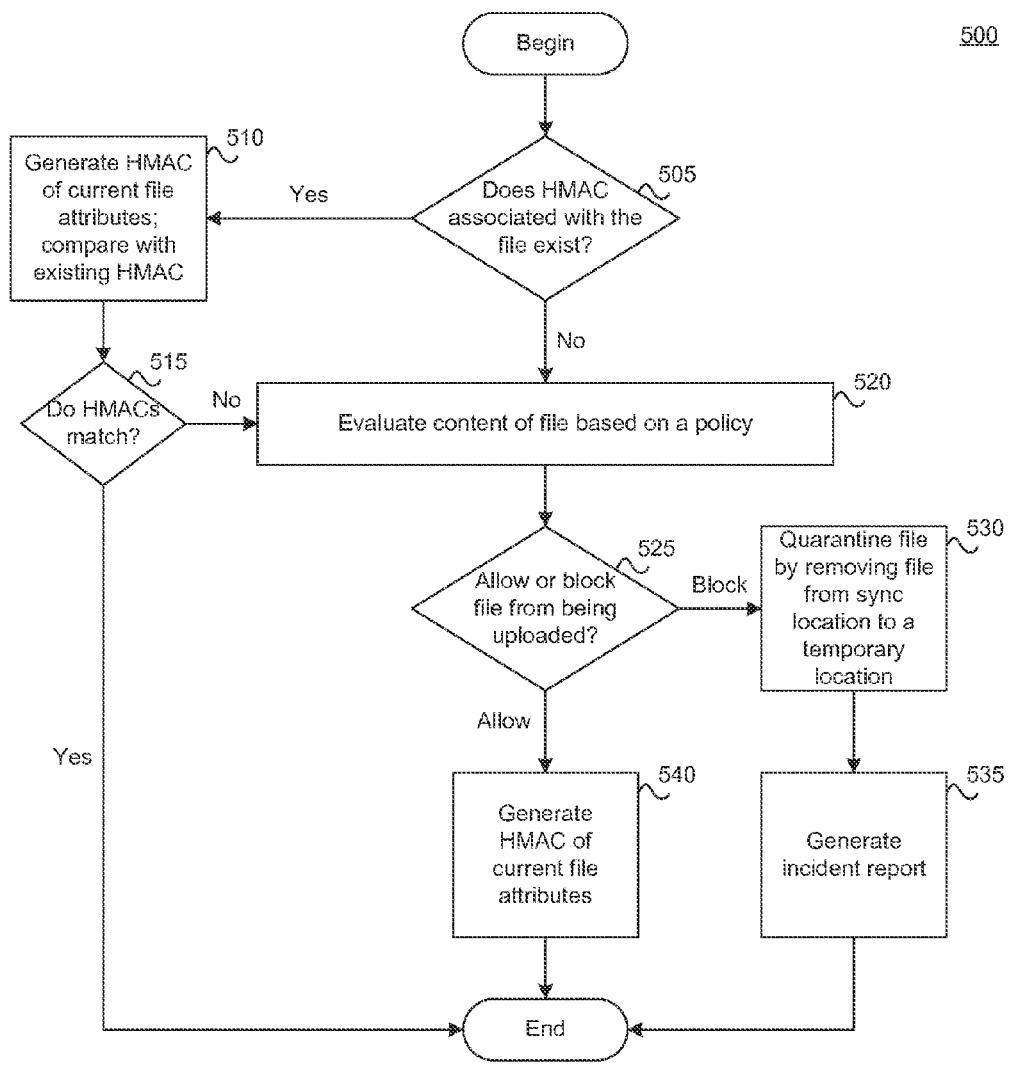
FIG. 5 illustrates a method for evaluating a file to be uploaded to a cloud storage service, according to one embodiment.

FIG. 5 illustrates a method for evaluating a file to be uploaded to a cloud storage service, according to one embodiment. Assume that the file system filter driver 108 determined that DLP analysis should be performed on the file. At step 505, the file system filter driver 108 determines whether a cryptographic hash, e.g., a HMAC, associated with the file has been generated. As stated, the file system filter driver 108 uses the HMAC to determine whether a given file was previously analyzed based on the DLP policy.

At step 510, if an HMAC for the file exists, then the file system filter driver 108 generates a new HMAC of the current file attributes (e.g., file type, file size, file path, etc.). The file system filter driver 108 then compares the existing HMAC with the newly generated HMAC to determine whether the HMACs match (at step 515). Non-matching HMACs suggests that the file was recently updated, and thus should be evaluated based on the DLP policy. However, if the HMACs match, then the file system filter driver 108 does not analyze the file because the file was previously analyzed and remains unchanged.

If no HMAC exists for the file (or if the newly-generated HMAC does not match with the existing HMAC), then at step 520, the DLP agent 106 evaluates the content of the file based on the DLP policy. The DLP agent 106 determines whether to allow or block the file from being uploaded (at step 525). For example, the DLP agent 106 may determine that the file should be blocked from being uploaded to the service 121 if the file contains sensitive data. In such a case, at step 530, the file system filter driver 108 relocates the file to a quarantined location in storage. Doing so prevents the cloud sync application 107 from repeatedly attempting to access the file. Further, at step 535, the DLP agent 106 may generate an incident report describing an unauthorized attempt to upload sensitive data to the service 121.

If the DLP agent 106 determines that the file should be allowed to be uploaded to the service 121, then the DLP agent 106 notifies the file system filter driver 108. At step 540, the file system filter driver 108 allows the sync operation to proceed normally. Further, the file system filter driver 108 generates a HMAC for the current attributes of the file and stores the HMAC. As a result, if the file remains unchanged and the cloud sync application 107 subsequently tries to access the file, the file system filter driver 108 does not perform any additional DLP analysis.

Figure 6:
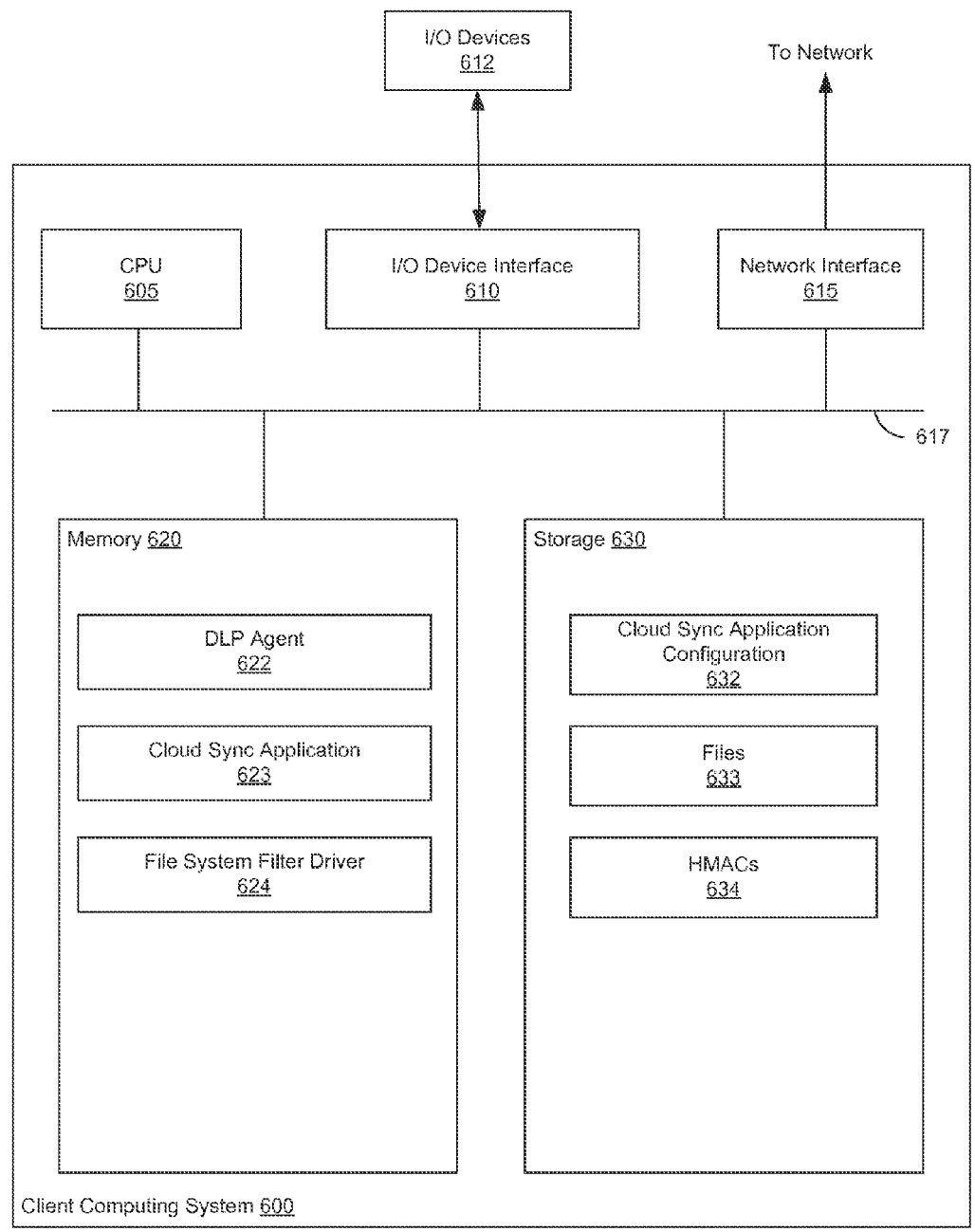
FIG. 6 illustrates a client computing system configured to prevent loss of sensitive data during a sync operation, according to one embodiment.

FIG. 6 illustrates a client computing system 600 configured to prevent loss of sensitive data during a sync operation, according to one embodiment. As shown, computing system 600 includes, without limitation, a central processing unit (CPU) 605, a network interface 615, a memory 620, and storage 630, each connected to a bus 617. The client computing system 600 may also include an I/O device interface 610 connecting I/O devices 612 (e.g., keyboard, display, mouse devices, etc.) to the client computing system 600. Further, in context of the present disclosure, the computing elements shown in the computing system 600 may correspond to a physical computing system (e.g., a system in an enterprise network).

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes a DLP agent 622, a cloud sync application 623, and a file system filter driver 624. And storage 630 includes a cloud sync application configuration 632, files 633, and HMACs 634 associated with each the files 632. The cloud sync application 107 syncs data between the client computing system 600 and a cloud storage service. The file system filter driver 624 monitors file system calls made by the cloud sync application 623. When the cloud sync application 623 attempts to sync a given file 633 with the cloud service, the file system filter driver 624 intercepts the call and determines, based on a DLP policy whether to prevent the sync from occurring. The file system filter driver 624 may generate an HMAC 634 of attributes associated with each file. The file system filter driver 624 uses the HMAC 634 to determine whether a given file 633 has changed since last evaluated under a DLP policy. If not, then the filter system filter driver 624 allows a sync operation to occur without any further DLP analysis. The DLP agent 622 may generate incident reports based on attempted sync operations where a user tries to upload sensitive data to the cloud storage service. Further, the DLP agent 622 may determine, based on the cloud sync application configuration 632, whether an account that is currently signed into the cloud service via the cloud sync application configuration 632 is associated with an enterprise network.

The preceding discussion presents a variety of embodiments. However, the present disclosure is not limited to the specifically described embodiments. Instead, any combination of the following features and elements, whether related to different embodiments or not, is contemplated to implement and practice the techniques described herein. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The following discussion presents a variety of embodiments. However, the present disclosure is not limited to the specifically described embodiments. Instead, any combination of the following features and elements, whether related to different embodiments or not, is contemplated to implement and practice the techniques described herein. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   intercepting a request, from a cloud sync application, to upload a file to a cloud storage service, wherein the file is currently stored on a client computer of an enterprise network;
   identifying an account associated with the request;
   generating a cryptographic hash of one or more file attributes associated with the file;
   evaluating the one or more file attributes associated with the file based on a data loss prevention (DLP) policy to determine whether to analyze the file using a DLP technique, wherein the file attributes include at least a file path, file name, file size, and file modified date;
   upon determining, based on the evaluation, to analyze the file, evaluating the file based on the DLP policy and the account associated with the request;
   blocking the request based on the evaluation of the file;
   intercepting a rename operation performed by the cloud sync application on the file; and
   updating the cryptographic hash of the attributes associated with the file based on the intercepted rename operation.

2. The method of claim 1, further comprising:
   upon determining that the cryptographic hash of the attributes associated with the file is present on the client computer, generating a second cryptographic hash of the attributes associated with the file;
   determining whether the cryptographic hash of the attributes and the second cryptographic hash of the attributes match; and
   upon determining that the cryptographic hash of the attributes and the second cryptographic hash of the attributes do not match, evaluating the file based on the DLP policy.

3. The method of claim 1, wherein the cryptographic hash is a hash-based message authentication code (HMAC).

4. The method of claim 1, wherein evaluating the file based on the DLP policy comprises:
   determining whether content of the file contains sensitive data according to the DLP policy.

5. The method of claim 4, wherein evaluating the file based on the DLP policy further comprises:
   upon determining that the content of the file contains sensitive data, preventing the request from proceeding.

6. A non-transitory computer-readable storage medium storing instructions, which, when executed on a processor, perform an operation, the operation comprising:
   intercepting a request, from a cloud sync application, to upload a file to a cloud storage service, wherein the file is currently stored on a client computer of an enterprise network;

identifying an account associated with the request;
generating a cryptographic hash of one or more file attributes associated with the file;
evaluating the one or more file attributes associated with the file based on a data loss prevention (DLP) policy to determine whether to analyze the file using a DLP technique, wherein the file attributes include at least a file path, file name, file size, and file modified date;
upon determining, based on the evaluation, to analyze the file, evaluating the file based on the DLP policy and the account associated with the request;
blocking the request based on the evaluation of the file;
intercepting a rename operation performed by the cloud sync application on the file; and
updating the cryptographic hash of the attributes associated with the file based on the intercepted rename operation.

7. The computer-readable storage medium of claim 6, wherein the operation further comprises:
upon determining that the cryptographic hash of the attributes associated with the file is present on the client computer, generating a second cryptographic hash of the attributes associated with the file;
determining whether the cryptographic hash of the attributes and the second cryptographic hash of the attributes match; and
upon determining that the cryptographic hash of the attributes and the second cryptographic hash of the attributes do not match, evaluating the file based on the DLP policy.

8. The computer-readable storage medium of claim 6, wherein the cryptographic hash is a hash-based message authentication code (HMAC).

9. The computer-readable storage medium of claim 6, wherein evaluating the file based on the DLP policy comprises:
determining whether content of the file contains sensitive data according to the DLP policy.

10. The computer-readable storage medium of claim 9, wherein evaluating the file based on the DLP policy further comprises:
upon determining that the content of the file contains sensitive data, preventing the request from proceeding.

11. A system, comprising:
a processor; and
a memory, storing program code, which, when executed by the processor, performs an operation, the operation comprising:
intercepting a request, from a cloud sync application, to upload a file to a cloud storage service, wherein the file is currently stored on a client computer of an enterprise network;
identifying an account associated with the request;
generating a cryptographic hash of one or more file attributes associated with the file;
evaluating the one or more file attributes associated with the file based on a data loss prevention (DLP) policy to determine whether to analyze the file using a DLP technique, wherein the file attributes include at least a file path, file name, and file modified date;
upon determining, based on the evaluation, to analyze the file, evaluating the file based on the DLP policy and the account associated with the request;
blocking the request based on the evaluation of the file;
intercepting a rename operation performed by the cloud sync application on the file; and
updating the cryptographic hash of the attributes associated with the file based on the intercepted rename operation.

12. The system of claim 11, wherein the operation further comprises:
upon determining that the cryptographic hash of the attributes associated with the file is present on the client computer, generating a second cryptographic hash of the attributes associated with the file;
determining whether the cryptographic hash of the attributes and the second cryptographic hash of the attributes match; and
upon determining that the cryptographic hash of the attributes and the second cryptographic hash of the attributes do not match, evaluating the file based on the DLP policy.

13. The system of claim 11, wherein the cryptographic hash is a hash-based message authentication code (HMAC).

14. The system of claim 11, wherein evaluating the file based on the DLP policy comprises:
determining whether content of the file contains sensitive data according to the DLP policy.

\* \* \* \* \*